(12) United States Patent  
Friedrich et al.

(10) Patent No.: US 9,221,383 B2
(45) Date of Patent: Dec. 29, 2015

(54) MODULAR CENTRAL INSTRUMENT

(71) Applicant: Bayerische Motoren Werke Aktiengesellschaft, Munich (DE)

(72) Inventors: Georg Friedrich, Munich (DE); Bernhard Schambeck, Woerthsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 43 days.

(21) Appl. No.: 13/712,420

(22) Filed: Dec. 12, 2012

(65) Prior Publication Data

US 2013/0099913 A1    Apr. 25, 2013

Related U.S. Application Data

(63) Continuation of application No. PCT/EP2011/058659, filed on May 26, 2011.

(30) Foreign Application Priority Data

Jun. 14, 2010  (DE) .......................... 10 2010 030 017

(51) Int. Cl.
*B60Q 1/00* (2006.01)
*G08B 5/36* (2006.01)
*G08B 25/00* (2006.01)
(Continued)

(52) U.S. Cl.
CPC . *B60Q 1/00* (2013.01); *B60K 35/00* (2013.01); *B60K 37/02* (2013.01); *G01P 1/08* (2013.01); *B60K 2350/1064* (2013.01); *B60K 2350/1072* (2013.01); *B60K 2350/2008* (2013.01)

(58) Field of Classification Search
CPC .............. G08B 5/22; B60Q 1/00; G02B 7/02; G02B 5/124; B60R 25/10
USPC ........................................................ 340/438
See application file for complete search history.

(56) References Cited

U.S. PATENT DOCUMENTS 2,941,497 A * 6/1960 Tyzzer ........................ 116/249
3,198,095 A * 8/1965 Cavanaugh .................. 396/556
(Continued)

FOREIGN PATENT DOCUMENTS

DE   43 25 721 A1   2/1995
DE   297 03 904 U1  6/1997
(Continued)

OTHER PUBLICATIONS

International Preliminary Report on Patentability (PCT/IB/373) and Written Opinion (PCT/ISA/237) dated Dec. 14, 2012 (Six (6) pages).
(Continued)

*Primary Examiner* — Jennifer Mehmood
*Assistant Examiner* — John Mortell
(74) *Attorney, Agent, or Firm* — Crowell & Moring LLP

(57) ABSTRACT

In the case of a central instrument in the center console of a motor vehicle having a circular display, on which a plurality of vehicle-relevant information is shown, the display has an at least approximately circular edge which contains several illuminants which are freely programmable in their brightness, are variably controlled during an operating phase of the motor vehicle and generate a luminous shape that varies with respect to time. The luminous shape supplies information on the condition and/or the function of the motor vehicle and/or of a motor vehicle component.

15 Claims, 2 Drawing Sheets

(51) Int. Cl.
  *G01D 11/28* (2006.01)
  *G02B 7/02* (2006.01)
  *B60K 35/00* (2006.01)
  *B60K 37/02* (2006.01)
  *G01P 1/08* (2006.01)

(56) References Cited

U.S. PATENT DOCUMENTS

| | | | |
|---|---|---|---|
| 3,603,960 A * | 9/1971 | Sanchez | 340/572.1 |
| 5,550,884 A * | 8/1996 | Berney | 377/5 |
| 5,949,346 A * | 9/1999 | Suzuki et al. | 340/815.45 |
| 7,369,044 B2 | 5/2008 | Ono et al. | |
| 7,382,234 B2 | 6/2008 | Yokota et al. | |
| 7,667,904 B2 * | 2/2010 | Lewis et al. | 359/811 |
| 8,881,038 B1 * | 11/2014 | Palmer | 715/764 |
| 2004/0090343 A1* | 5/2004 | Cassell et al. | 340/815.78 |
| 2009/0116212 A1 | 5/2009 | Dietrich et al. | |
| 2011/0043355 A1* | 2/2011 | Chander et al. | 340/455 |

FOREIGN PATENT DOCUMENTS

| | | |
|---|---|---|
| DE | 101 44 615 A1 | 3/2003 |
| DE | 10 2005 003 919 A1 | 9/2005 |
| DE | 10 2005 052 007 A1 | 5/2006 |
| DE | 10 2005 001 530 A1 | 7/2006 |
| DE | 10 2005 043 235 A1 | 3/2007 |
| DE | 10 2006 047 055 A1 | 4/2008 |
| DE | 10 2007 016 366 A1 | 7/2008 |
| DE | 10 2007 025 142 A1 | 12/2008 |
| DE | 10 2007 026 283 A1 | 12/2008 |
| DE | 10 2007 029 033 A1 | 12/2008 |
| EP | 0 900 686 A2 | 3/1999 |
| WO | WO 98/38059 A1 | 9/1998 |

OTHER PUBLICATIONS

International Search Report dated Sep. 7, 2011 w/ English translation (six (6) pages).
German Search Report dated Feb. 10, 2011 w/ partial English translation (nne (9) pages).

* cited by examiner

MODULAR CENTRAL INSTRUMENT

CROSS REFERENCE TO RELATED APPLICATIONS

This application is a continuation of PCT International Application No. PCT/EP2011/058659, filed May 26, 2011, which claims priority under 35 U.S.C. §119 from German Patent Application No. 10 2010 030 017.9, filed Jun. 14, 2010, the entire disclosures of which are herein expressly incorporated by reference.

BACKGROUND AND SUMMARY OF THE INVENTION

The invention relates to a modular central instrument in the center console of a motor vehicle having a round, preferably circular display, in which a plurality of vehicle-relevant information is shown.

A central instrument of this type is known from German Patent Document DE 10 2006 047 055 A1. It is preferably constructed as a graphic module which takes over the graphically high-quality display function for driving and infotainment information. The display preferably is a fully graphical liquid-crystal display. This display permits high flexibility when representing the driving and infotainment functions.

It is an object of the present invention to create a central instrument of the above-mentioned type, which increases the informative value of the information shown in the display.

This and other objects are achieved by a central instrument in the center console of a motor vehicle having a round display, on which a plurality of vehicle-relevant information is shown. The display contains several light sources which are freely programmable in their brightness, which are variably controlled during an operating phase of the motor vehicle and which generate a luminous shape that varies with respect to time, the luminous shape supplying information on the condition and/or the function of the motor vehicle and/or of a motor vehicle component.

Advantageous embodiments and further developments, which can be used individually or combined with one another, are described and claimed herein.

The central instrument according to the invention is distinguished by the fact that the light sources (illuminants) arranged on the circular or oval edge, as a result of its variable color design, emphasize the attention value of the information represented in the display. If, for example, the value of the vehicle speed is represented in the display by way of an indicator instrument, and if the momentary value is above the currently permissible value recognized, for example, by an image recognition system by use of the speed limit signs set up along the road, the illuminants may be tinted red at the edge. If the vehicle is moving within the admissible maximum speed, the edge is, for example, tinted green.

The light sources themselves may be LEDs, EL foils, OLEDs, lasers or an edge area of the display itself, which, corresponding to the invention, may have a color-variable design. The generated light may be emitted either directly or indirectly, by way of, for example, optical fibers.

When the illuminants of one color, each by themselves, form an at least approximately closed circle, special luminous shapes can be generated by the ring structure of the illuminants. Thus, a rotating light wave can be generated in that several illuminants situated side-by-side apparently rotate clockwise or counterclockwise around the display. In the respective moving direction, the respective preceding illuminant is switched on, while simultaneously the respective last illuminant is switched off. Several light waves rotating in the same rotating direction or two counter-rotating light waves can also be formed. It thereby becomes possible, for example, at the start of a drive, to signal the readiness to drive or to draw attention to special dangerous situations. This makes it possible to use the illuminants in addition to information possibly shown in the display concerning critical temperature values of vehicle components, such as the internal-combustion engine and cooling water or supply quantities of operating agents, such as washing water, fuel or drive energy in order to, solely by way of the luminous shape, draw the vehicle user's attention to these special situations.

Particularly memorable information concerning the value represented by the luminous shape is obtained when the luminous shape formed by the illuminant is symmetrical with respect to a display meridian. The meridian is an imaginary line which extends from the top to the bottom and forms a symmetric line. When the luminous shape is symmetrical to this line, rhythmically controlled illuminants result in a pulsating effect which itself can easily be interpreted as a symbolic expression of vehicle-relevant functions, such as existing or limited operability of the vehicle or, for example, an arbitrarily activated direction indication.

The edge body may be demountable and may therefore be replaceable. As a result, the display function can be changed during the running time of the vehicle. In connection with a change of the programming for the information indicated in the display, it thereby becomes possible, for example, to show, instead of or in addition to the display of the vehicle speed, the rotational speed of the drive assembly. This will be implemented at particularly low expenditures if the edge body carries one or more scales for the functions shown in the display and/or partially covers the illuminants arranged at the edge.

Furthermore, the edge body can also be used for implementing special surface effects. Examples of surface effects are a dull, a high-gloss, a colored, a chromatic or a reflective surface or a surface with a black panel or glass effect.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2A:
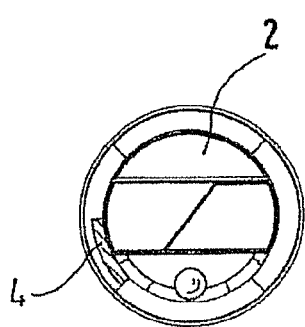
FIGS. 2a-2c illustrate another exemplary central instrument for showing economical driving of the motor vehicle.
Figure 2B:
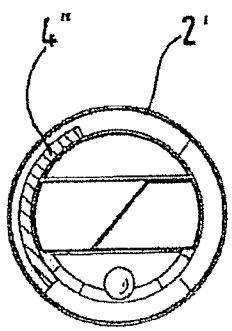
Figure 2C:
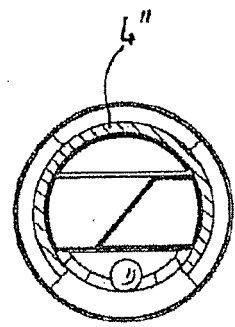
Figure 3:
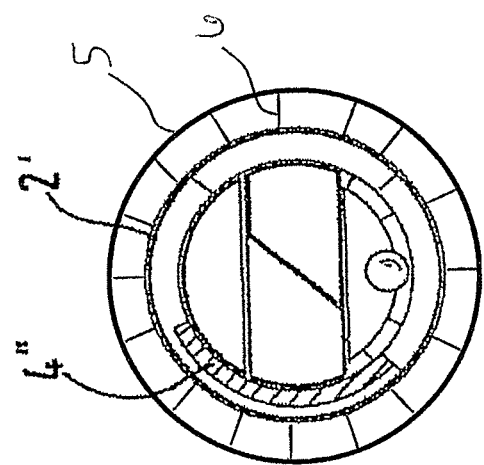
FIG. 3 illustrates another exemplary central instrument in which a circular screen is placed on the edge of the display.

Three embodiments are illustrated in FIGS. 1-3. These embodiments explain the invention in detail.

Figure 1A:
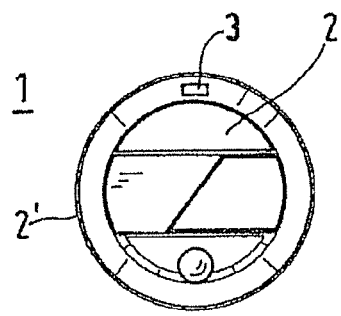
FIGS. 1a-1c illustrate an exemplary central instrument according to the invention for showing operational readiness of a vehicle system.
Figure 1C:
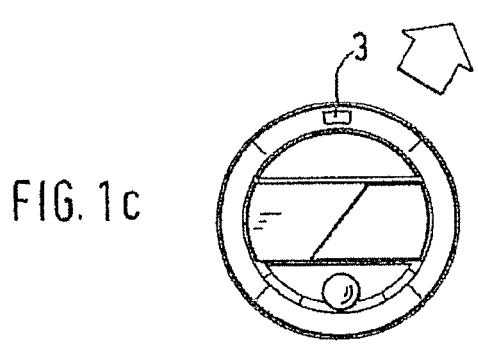
Figure 1B:
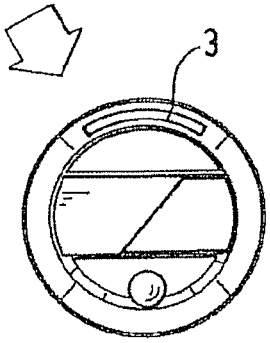

In the embodiment of FIG. 1, the operational readiness and/or the "on" switching state of an antitheft warning system are signaled with the central instrument while the vehicle is stationary. For this purpose, the red LEDs 3 arranged in the upper area of the edge 2' are alternately switched on at an angle of 10° (FIG. 1a), 40° (FIG. 1b) and again 10° (FIG. 1c) in the central instrument 1, while the display 2 is switched off. The change between the luminous shapes of FIGS. 1a, 1b and 1c takes place at a frequency of 60 Hz. There is a rest period of 1 sec. between the luminous shapes of FIGS. 1a and 1c, during which all LEDs are switched off. The resulting total luminous shape is symbolized by a beating heart which illustrates that the vehicle is active to a limited extent.

In this function display, the condition of the vehicle is symbolized corresponding to a heartbeat. In this case, the determining parameter may be the temperature of an internal-combustion engine. The same applies during a start-stop operation. Less energy is available to the onboard energy supply system than during a drive and energy is saved. This condition is also illustrated by way of a quiet pulse rate. While, before a drive, as a rule, the engine is cold and the vehicle is ready to be used, which is symbolized by a steady "pulse rate" of 60 Hz, the soon to be depleted energy supply at the end of a drive can be symbolized by a diminished flashing of the same LEDs 3 at a reduced frequency of 30 Hz.

Although, at the end of the drive, the engine will be warm and slowly cool down again, while the energy supply is still completely sufficient, this can be symbolized by a luminous shape, which can be clearly shown by an increased frequency of, for example, 90 Hz and a widening of the luminous shape to 60°, i.e. a high-frequency and high-energy "pulse rate", which gradually and with an increasing cooling of the engine changes into the above-mentioned rest condition.

Finally, in the embodiment of FIG. 2, the vehicle user is aided in his intention of driving particularly economically. In this case, an increasingly growing and completing circle 4, 4' and 4" rotates around the display 2. This is illustrated in FIGS. 2a, 2b and 2c. The circle is formed, for example, of green LEDs. The speed at which the circular ring is enlarged depends on the operational economics. If, for example, the minimal fuel consumption that corresponds to the respective operating condition is used as the criterion for this purpose, the speed at which the luminous shape of the completely illuminated circle is enlarged will be the greater the closer the actual consumption is to the ideal value. In this case, the luminous shape may also regress, specifically when the consumption is unusually high. The completing of a light circle can also be symbolized by an additional symbol in the display, for example, by a star (not shown). The light circle 4 will then start again from the beginning. At the end of a drive, the driver will then symbolically receive information concerning his driving efficiency by means of the number of stars. By means of luminous shapes, the vehicle user therefore obtains valuable information regarding the quality of the vehicle operability (FIG. 1) or the efficiency of his driving method (FIG. 2).

A further development of the invention is shown in FIG. 3. It consists of placing a circular screen 5, which is provided with a marking 6, on the edge 2'. A scale can thereby be implemented, and a weighted progress bar can be achieved, for example, for the embodiment illustrated in FIG. 2. The vehicle user will receive the information as to what percentage of a complete circle has already been reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A central instrument for a center console of a motor vehicle, comprising:

a round display in which a plurality of vehicle-relevant information are displayed; and a demountable edge body operatively arranged on an edge of the round display, wherein the edge body is demountable from the round display, wherein the round display comprises multiple light sources, the light sources being freely controllable with regard to brightness of the light sources and variably controllable during an operating phase of the motor vehicle in order to generate a luminous shape that varies over time, wherein the luminous shape is configured to vary in a repeating fashion to supply vehicle-relevant information on at least one of a condition and function of at least one of the motor vehicle and a component of the motor vehicle, and wherein the edge body comprises a scale configured to implement a progress bar corresponding to the luminous shape.

2. The central instrument according to claim 1, wherein the light sources have different colors.

3. The central instrument according to claim 1, wherein the light sources of one color each separately form an at least approximately closed ring.

4. The central instrument according to claim 2, wherein the light sources of one color each separately form an at least approximately closed ring.

5. The central instrument according to claim 1, wherein the luminous shape formed by the light sources is symmetrical with respect to a display meridian of the round display.

6. The central instrument according to claim 1, wherein the edge body is operatively arranged to cover a part of the light sources.

7. The central instrument according to claim 1, wherein the controlling of the light sources is coordinated with an aspect of the edge body, and further wherein the light sources are controlled to form at least one individual display instrument of the motor vehicle.

8. The central instrument according to claim 5, wherein the controlling of the light sources is coordinated with an aspect of the edge body, and further wherein the light sources are controlled to form at least one individual display instrument of the motor vehicle.

9. The central instrument according to claim 1, wherein the round display is a circular display having a circular edge portion in which the multiple light sources are arranged.

10. The central instrument according to claim 9, wherein the progress bar corresponds to a percentage of the circular edge portion that is illuminated by said multiple light sources.

11. The central instrument according to claim 1, wherein the repeating fashion in which the luminous shape is configured to vary is in the form of a rotating light wave about the round display.

12. The central instrument according to claim 1, wherein the repeating fashion in which the luminous shape is configured to vary is in the form of a heartbeat.

13. The central instrument according to claim 1, wherein the luminous shape is configured to vary in the repeating fashion at a frequency rate.

14. The central instrument according to claim 13, wherein the frequency rate is between 30 Hz and 90 Hz.

15. The central instrument according to claim 13, wherein the luminous shape is configured to vary in the repeating fashion in terms of at least one of color and shape.

\* \* \* \* \*